United States Patent
Watzke

[11] Patent Number: 5,876,043
[45] Date of Patent: Mar. 2, 1999

[54] THREADING OR DRILL CHUCK WITH WIRELESS FAULT TRANSMISSION

[75] Inventor: Ruediger Watzke, Neunkirchen am Sand, Germany

[73] Assignee: Emuge-Werk Richard Glimpel Fabrik fuer Praezisionswerkzeuge, Lauf, Germany

[21] Appl. No.: 974,362

[22] Filed: Nov. 19, 1997

[30] Foreign Application Priority Data

Nov. 20, 1996 [DE] Germany .................. 196 47 989.4

[51] Int. Cl.$^6$ .................................................. B23B 31/02
[52] U.S. Cl. .................................. 279/126; 408/6; 408/11
[58] Field of Search .................. 279/126, 125; 408/8, 11, 6

[56] References Cited

U.S. PATENT DOCUMENTS 4,090,802  5/1978  Bilz ............................................. 408/6

FOREIGN PATENT DOCUMENTS

| 258989 | 3/1988 | European Pat. Off. ............... 279/126 |
| 286529 | 1/1991 | Germany ................................ 279/126 |
| 111117 | 5/1991 | Japan ........................................... 408/6 |
| 818768 | 4/1981 | U.S.S.R. ...................................... 408/8 |

*Primary Examiner*—Daniel W. Howell
*Assistant Examiner*—Rouzbeh Tabaddor
*Attorney, Agent, or Firm*—Jordan and Hamburg LLP

[57] ABSTRACT

A chuck comprising a chuck body and monitoring electronics for detecting chuck faults fitted within the chuck body. A wireless transmission means is provided on the chuck body for transmitting signals from the monitoring electronics. The chuck has a dynamo having a housing fixed in the chuck body and a rotatable rotor having a mass for rotating relative to the housing when the chuck rotates due to an inertial moment of the mass to produce electric energy to power the monitoring electronics. Optionally provided is an electric energy storage means for storing energy from the dynamo and powering the monitoring electronics to provide for constant operation of the monitoring electronics.

15 Claims, 1 Drawing Sheet

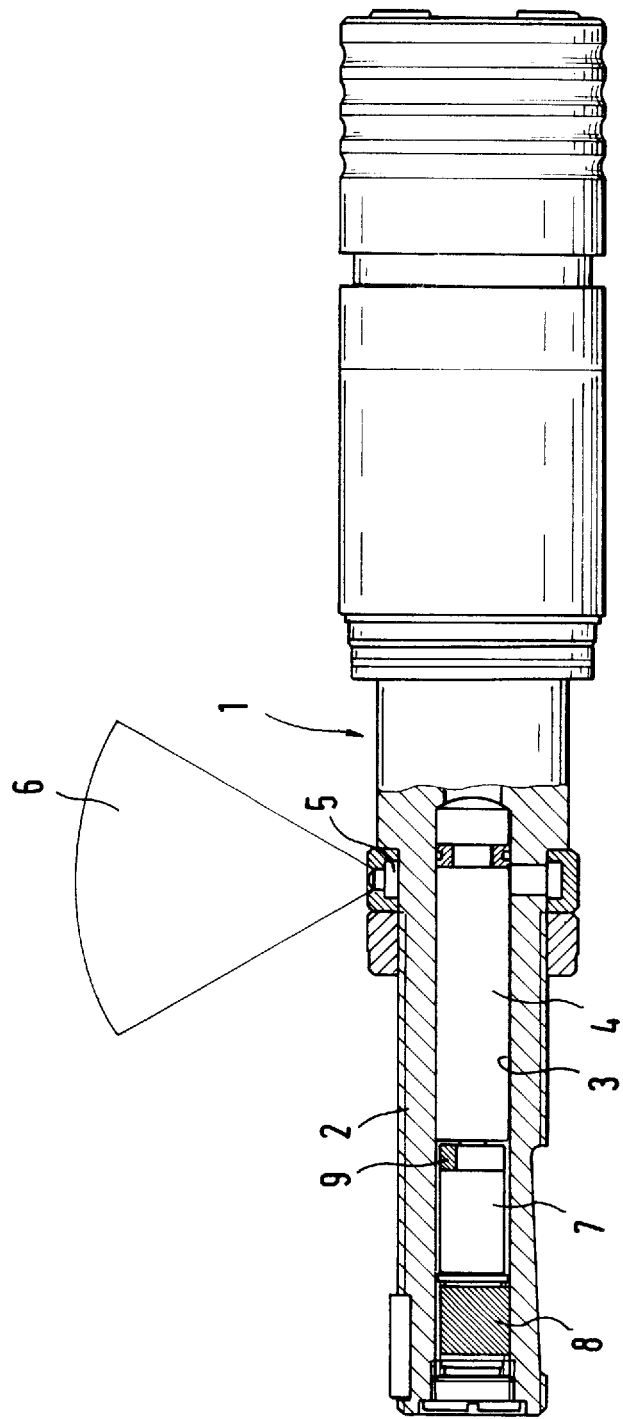

THREADING OR DRILL CHUCK WITH WIRELESS FAULT TRANSMISSION

BACKGROUND OF THE INVENTION

The present invention relates to a threading or drill chuck with built-in monitoring electronics for signalling faults via a wireless transmission device, and, more particularly, to a threading or drill chuck with built-in monitoring electronics having a self contained dynamo for powering the monitoring electronics.

During threading, or also in a corresponding fashion during drilling, faults occur as a result of worn tools and other reasons. It is necessary to promptly recognize such faults in order to prevent the manufacturing process from being unnecessarily obstructed and to avoid errors and damage to the machine and tool. For example, during threading a length compensation of the threading chuck is telescoped by faults of this type. Devices exist which can detect such faults and provide an electrical signal to alert operators to the existence of a fault.

The possibility of providing built-in monitoring electronics for externally signalling the types of movements indicative of a fault of a threading chuck via end or proximity switches and cable connections exists. However, the provision of wireless transmission devices has also been proposed. Such wireless devices emit fault signals from the built-in monitoring electronics as electromagnetic or optical signals. The fault signals are then received by an external receiver and correspondingly influence the drive of the threading machine or drill.

Built-in monitoring electronics having a power supply device which operates using coupled electromagnetic shafts have been proposed. However, such a mechanism is structurally very complex and prone to disturbance. Accordingly, built-in monitoring devices having batteries fitted in the drill chuck have conventionally been used for operating the built-in monitoring electronics and the wireless transmission device operating therewith. However, such an arrangement requires that the monitoring electronics also monitor the battery voltage and capacity and that the battery be replaced each time its capacity falls below a given threshold. The replacement of the batteries results in considerable expense and labor.

SUMMARY OF THE INVENTION

Accordingly, it is an object of the present invention to provide a threading or drilling chuck with built-in monitoring electronics which overcomes the drawbacks of the prior art.

It is a further object of the present invention to provide a threading or drill chuck with built-in monitoring electronics having a structure that is simplified and which obviates the need for disruptive and expensive battery replacement.

Briefly stated, the present invention provides a chuck having monitoring electronics built into the chuck for detecting faults and a dynamo built into the chuck for providing power to the built-in monitoring electronics. The dynamo includes a rotor having gyrating mass. The gyrating mass causes the rotor to move relative to the rest of the dynamo, which is fixed in the drill chuck, as the drill chuck rotates due to its moment of inertia and thereby generate power for the built-in monitoring electronics. Due to the coupling of the rotor and frictional forces, the speed of the rotor eventually matches that of the chuck if the chuck speed remains constant. However, as the drill chuck changes rotation direction or speed, the rotor again turns within the dynamo thereby generating power for the monitoring electronics.

In accordance with these and other objects of the invention, there is provided a gyrating mass flanged onto a dynamo, which, during the change in direction of the threading chuck from clockwise to anti-clockwise or from anti-clockwise to clockwise rotation, and naturally also during rotation speed changes including starting acceleration and stopping deceleration, continues to rotate in the respective opposite direction or at the prior speed as a result of the moment of inertia which is generated. Electromagnetic voltage is then generated by the dynamo as a result of the relative movement, until the speed of rotation of the dynamo and of the gyrating mass drive are balanced as a result of the ensuing coupling to the gyrating mass drive.

According to a feature of the invention, there is further provided a storage medium, for example an accumulator or capacitor, connected to the dynamo for storing energy generated by the dynamo and supplying power to the monitoring electronics in order to ensure constant operation of the monitoring electronics.

The present invention further includes a wireless transmission device with an infrared light diode for signalling faults to the outside.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1 is an elevation view, partially in cross section, of an embodiment of a threading chuck of the present invention.

DETAILED DESCRIPTION OF THE INVENTION

Referring to FIG. 1, there is shown a threading chuck 1 with a chuck shaft 2 having a bore 3. Monitoring electronics 4 are fitted into the bore 3 and an infrared light diode 5 is provided on an external portion of the chuck 1. The monitoring electronics 4 detect and process possible faults and drive the infrared light diode 5 with signals indicative of a type of fault in order to signal receiving equipment, in a wireless manner, which in turn controls the operation of machinery driving the chuck 1. An external operating range of the infrared light diode 5 is indicated as a sector 6 in FIG. 1. It is realizable by those of ordinary skill in the art having the benefit of the present disclosure to incorporate other wireless transmission devices into the chuck 1 such as electromagnetic devices.

The chuck 1 has a dynamo 7 and with a storage medium 8 connected thereto. The storage medium 8 is realizable in the form of an accumulator, or rechargeable battery, or a capacitor for example. The storage medium 8 is connected to store energy from the dynamo 7 and to supply power to the monitoring electronics 4.

The housing of the dynamo 7 is fixedly connected to the chuck shaft 2 and has a rotatably mounted rotor with a gyrating mass 9 mounted thereon. The gyrating mass 9 is eccentrically mounted on the rotor. During rotation speed changes such as starting acceleration and stopping deceleration of the threading chuck 1 and during a change from clockwise to anticlockwise rotation and vice versa, differing directions of rotation and/or speeds of rotation of the housing of the dynamo 7 and the rotor of the gyrating mass 9 are produced as a result of the moment of inertia. The differential movements generate energy which is stored in the storage medium 8 ready for use by the infrared electronics.

Having described preferred embodiments of the invention with reference to the accompanying drawing, it is to be understood that the invention is not limited to those precise embodiments, and that various changes and modifications may be effected therein by one skilled in the art without departing from the scope or spirit of the invention as defined in the appended claims.

What is claimed is:

1. A chuck including a chuck body having built-in monitoring electronics for signalling faults via a wireless transmission device, a gyrating mass built into the chuck body, and a dynamo built into the chuck body and driven by the gyrating mass for generating current for operation of the monitoring electronics.

2. The chuck according to claim 1, wherein the dynamo has a housing fixedly connected to the chuck body and the gyrating mass is eccentrically arranged on a rotor of the dynamo.

3. The chuck according to claim 1 further comprising a storage medium connected downstream of the dynamo.

4. The drill chuck according to claim 3, wherein the storage medium is an accumulator.

5. The chuck according to claim 3, wherein the storage medium is a capacitor.

6. The chuck according to claim 1 wherein the wireless transmission device comprises an infrared light diode.

7. A chuck comprising:

a chuck body;

monitoring electronics for detecting chuck faults, said monitoring electronics being fitted within said chuck body; and a dynamo having a housing fixed in said chuck body and a rotatable rotor having a mass for rotating relative to said housing when said chuck rotates due to an inertial moment of said mass to produce electric energy to power said monitoring electronics.

8. The chuck according to claim 7, further comprising an electric energy storage means for storing energy from said dynamo and powering said monitoring electronics to provide for constant operation of said monitoring electronics.

9. The chuck according to claim 8 wherein said electric energy storage means is a battery.

10. The chuck according to claim 8 wherein said electric energy storage means is a capacitor.

11. The chuck according to claim 7, further comprising a wireless transmission means, on said chuck body, for transmitting signals from said monitoring electronics.

12. The chuck according to claim 11, wherein said wireless transmission means is an infrared device.

13. The chuck according to claim 7 wherein said chuck body has a bore and said monitoring electronics and said dynamo are fitted within said bore.

14. A chuck comprising:

a chuck body;

monitoring electronics for detecting chuck faults, said monitoring electronics being fitted within said chuck body;

a wireless transmission means, on said chuck body, for transmitting signals from said monitoring electronics;

a dynamo having a housing fixed in said chuck body and a rotatable rotor having a mass for rotating relative to said housing when said chuck rotates due to an inertial moment of said mass to produce electric energy to power said monitoring electronics; and an electric energy storage means for storing energy from said dynamo and powering said monitoring electronics to provide for constant operation of said monitoring electronics.

15. The chuck according to claim 14 wherein said chuck body has a bore and said monitoring electronics and said dynamo are fitted within said bore.

* * * * *